United States Patent [19]

Duran et al.

[11] 4,427,379
[45] Jan. 24, 1984

[54] HEAT TREATMENT FIXTURE

[76] Inventors: Reginald F. Duran, 231 E. Borromeo, Placentia, Calif. 92670; Jack Brass, 5650 Via Ceresa, Yorba Linda, Calif. 92686

[21] Appl. No.: 365,188

[22] Filed: Apr. 5, 1982

[51] Int. Cl.³ .......................... C21D 9/00; B62B 1/00; F27D 5/00
[52] U.S. Cl. .................................. 432/261; 211/182; 280/79.3; 296/3; 432/253
[58] Field of Search ....................... 432/253, 261, 245; 280/79.3; 296/3; 211/182, 194

[56] References Cited

U.S. PATENT DOCUMENTS

| 1,966,751 | 7/1934 | Brefeld | 280/79.3 |
| 1,968,273 | 7/1934 | Wegner | 280/79.3 |
| 2,176,072 | 10/1939 | Harris | 432/261 |
| 2,882,032 | 4/1959 | Garner | 432/261 |
| 3,739,921 | 6/1973 | Schmidt | 432/261 |

FOREIGN PATENT DOCUMENTS 1057333 3/1954 France .................. 211/194

Primary Examiner—John J. Camby
Attorney, Agent, or Firm—Hubbard & Stetina

[57] ABSTRACT

An improved heat treatment fixture is disclosed formed in a tubular frame network structure composed of mating plural cylindrical tubings segments and cast couplings which are interconnected by pins to permit moderate movement within the frame network structure during the heat treatment process, and thereby. relieve thermal stresses developed within a fixture. The tubing frame network structure renders the fixture lightweight and is adapted to permit multiple fixtures to be rapidly linked together in an end to end orientation to vary the size and capacity of the fixture. The fixture is further constructed to allow rapid repair by the end user to prolong the useful life of the fixture and includes a part tray which is replaceable directly within the field.

11 Claims, 9 Drawing Figures

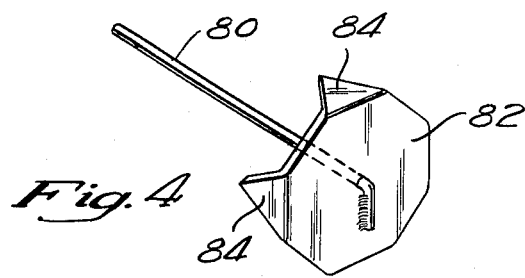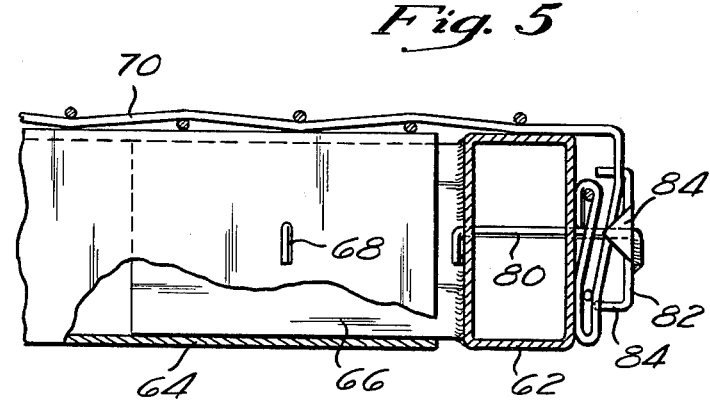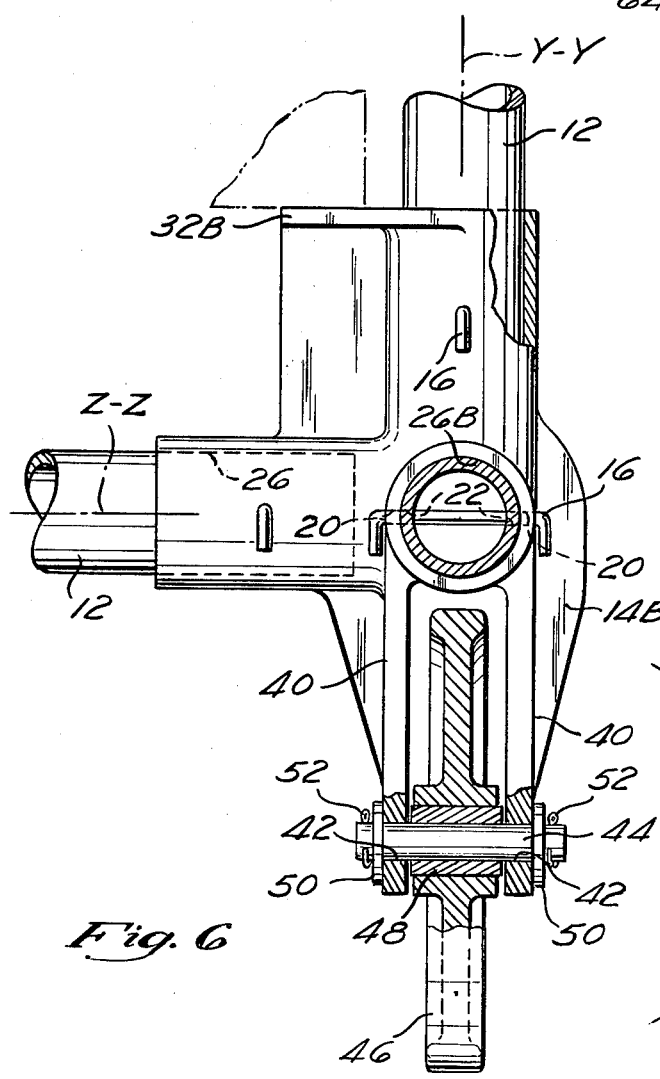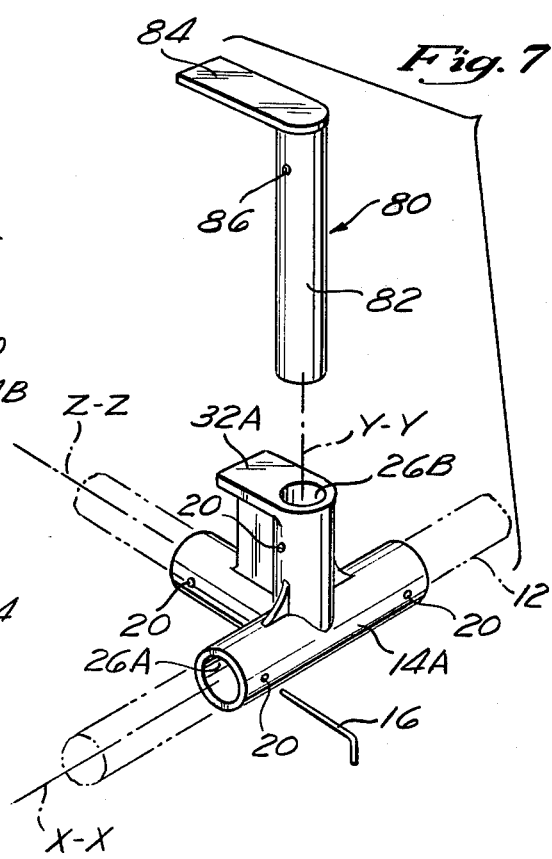

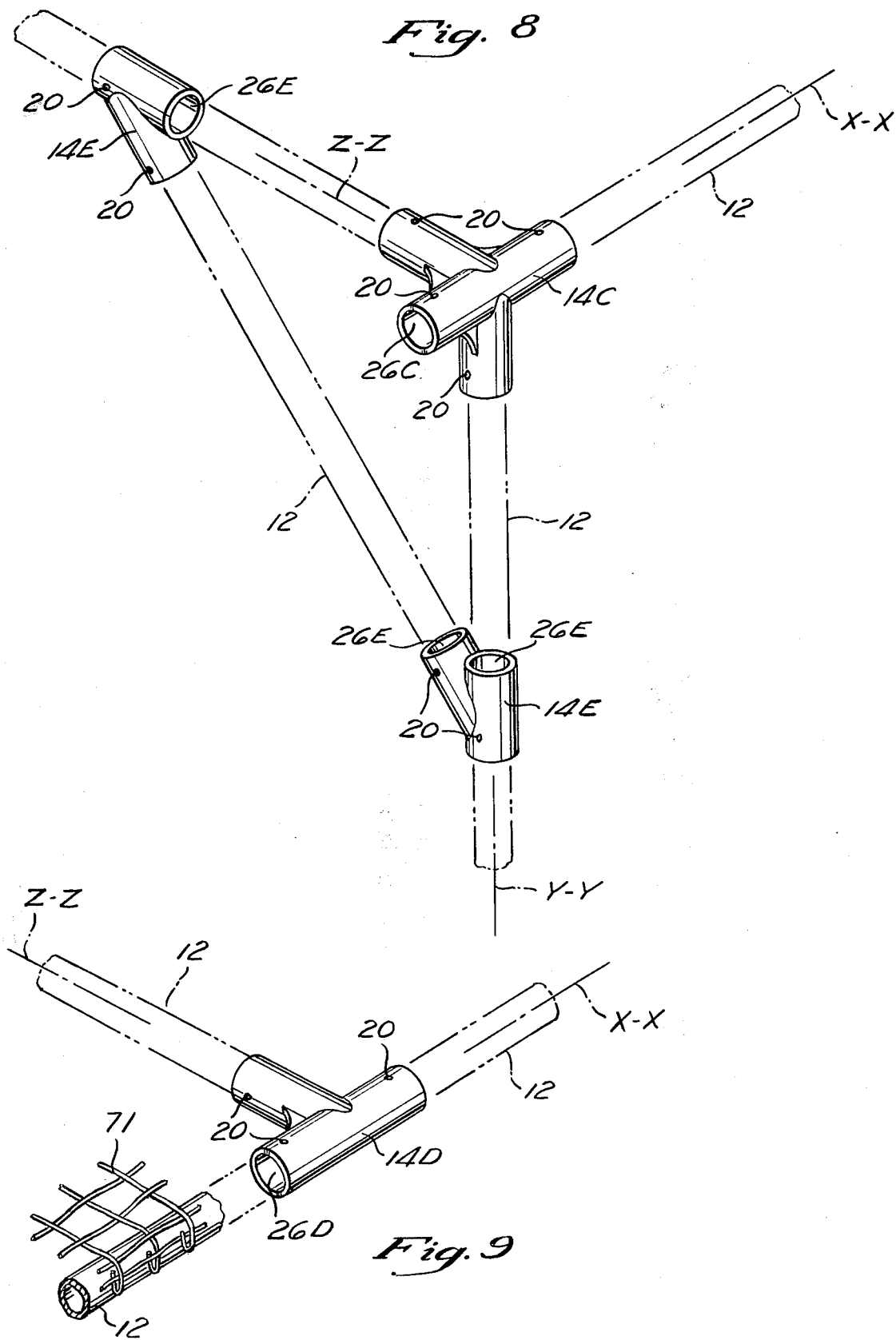

HEAT TREATMENT FIXTURE

BACKGROUND OF THE PRESENT INVENTION

The present invention relates to heat treatment fixtures and more particularly, to an improved heat treatment fixture which is constructed in a manner to relieve thermal stresses developed within the fixture during the heat treatment process.

Various metal fabricated parts are heat treated, typically subsequent to machining operations, to modify the physical properties (i.e hardness) of the product. As is well known, the heat treatment process contemplates the placement of the fabricated metal products upon a heat treatment fixture which is inserted into a furnace to raise the temperature of the fabricated part and fixture to a predetermined level within a specific time interval. Subsequently, the fabricated products are cooled or quenched within a predetermined time period to yield the desired physical properties to the prefabricated products.

Heretofore, the majority of the heat treatment fixtures utilized in the prior art have comprised relatively large carts or similar vehicles, typically formed of stainless steel rectangular elongate members which have been rigidly welded and or bolted together in a frame-like network. The lowermost portion of the prior art fixtures have usually included a rigid grid adapted to carry or support the prefabricated parts thereon and have been provided with roller bearing mounted wheels to permit the fixture to be manually inserted and removed (i.e. loaded and unloaded) from the heat treatment furnace. Although such prior art heat treatment fixtures have proven generally suitable in the past, they possess substantial deficiencies which detract from their overall effectiveness in the trade.

Foremost of these deficiencies has been the inability of the prior art heat treatment fixtures to accommodate or withstand the thermal expansion and contraction encountered during the heat treatment process. This inability has caused the prior art heat treatment fixtures to either routinely become warped during prolonged use, thereby hindering the insertion and removal of the same into the heat treatment furnace or in severe instances, has caused the fixture to crack or structurally fail thus preventing the fixture from being further utilized without costly structural repair as by way of cutting and/or welding. Although these thermal expansion problems have been recognized in the art, the solutions to date have comprised the use of heavier structural members and/or the use of stronger rigid weldments or bolt connections on the fixture in an attempt to provide a structure capable of withstanding the thermal expansions.

In addition, due to the prior art heat treatment fixtures typically being formed of relatively heavy stainless steel members, they necessitate a substantial amount of heat energy to be transferred to the same during the heat treatment process, which in many instances, prevents the heat treatment furnace from raising the temperature of the fabricated products to specified tolerances within the required heat treatment time period. As such, the use of the prior art heat treatment fixtures has often resulted in improper heat treatment specifications resulting in a many of prefabricated parts becoming scrapped during the heat treatment process.

Further, in view of the rigid, heavy stainless steel structure of the prior art heat treat fixtures, they have been extremely difficult to manually insert within the heat treat furnace. In addition, such prior art fixtures have typically been expensive to initially purchase as well as subsequently repair, and have failed to provide any mechanism to permit the length and/or volume of the fixture to be modified at the end user's location to adapt the fixture to meet the particular heat treatment production requirements.

As such, there exists a substantial need in the art for an improved heat treatment fixture which is relatively lightweight and economical in use, is capable of withstanding without damage, the thermal expansion encountered during heat treatment process, and which may be rapidly repaired and modified directly in the field to meet the particular heat treatment production requirements.

SUMMARY OF THE PRESENT INVENTION

The present invention specifically addresses and alleviates the above-referenced deficiencies associated in the prior art by providing a lightweight, generally low-cost, improved heat treatment fixture which is specifically adapted to accommodate the thermal stresses and expansion without damage during the heat treatment process. More particularly, the improved heat treatment fixture of the present invention is characterized by use of a unique frame construction wherein plural cylindrical tubing segments and multiple cast couplings are interconnected by pins which permit moderate movement of the tubing segments relative the cast couplings during the heat treatment process. Due to this purposeful and permissible amount of movement between the tubing segments and couplings, the heat treat fixture of the present invention readily accommodates thermal expansion encountered during the heat treat process as well as relieves any thermal stresses which are generated within the fixture.

The cylindrical tubing segments and cast couplings are preferably fabricated from a nickel alloy which render the composite fixture structure extremely lightweight and capable of being rapidly heated to suitable heat treatment temperatures in a furnace. As such, the improved heat treatment fixture of the present invention permits easier certification of the heat treatment furnace for a variety of heat treatment applications and additionally, permits easy insertion and removal of the fixture from the heat treatment furnace by personnel.

The pin-inteconnected/cylindrical tubing and cast coupling design of the present invention additionally accommodates a modular type construciton which permits the length and thus the capacity of the fixture to be rapidly modified directly within the field or alternatively permits multiple fixtures to be rapidly joined in an end to end orientation. This modular construction further permits the rapid repair of the fixture directly within the field without the prior art's requirement of utilizing cutting torches and/or welding equipment.

DESCRIPTION OF THE DRAWINGS

These as well as other features of the present invention will become more apparent upon reference to the drawings wherein:

FIG. 4 is an enlarged perspective view depicting the wire mesh pin and washer utilized to attach the wire mesh part tray to the part tray frame;

FIG. 5 is an enlarged cross-sectional view illustrating the manner in which the wire mesh pin of FIG. 4 is assembled to the part tray frame;

FIG. 6 is an enlarged partial cross-sectional view illustrating the wheel and axle assembly of the heat treatment fixture of the present invention;

FIG. 7 is an exploded view of the support "T" cast coupling of the present invention and illustrating the manner in which the part tray is carried by the fixture;

FIG. 8 is a perspective view of the diagonal and multiple "T" cast couplings of the present invention illustrating the manner in which the same are interconnected to the cylindrical tubing segments; and FIG. 9 is an enlarged perspective view of the single "T" cast coupling of the present invention illustrating the manner in which it is connected to plural cylindrical tubing segments.

DETAILED DESCRIPTION OF THE PREFERRED EMBODIMENT

Figure 1:
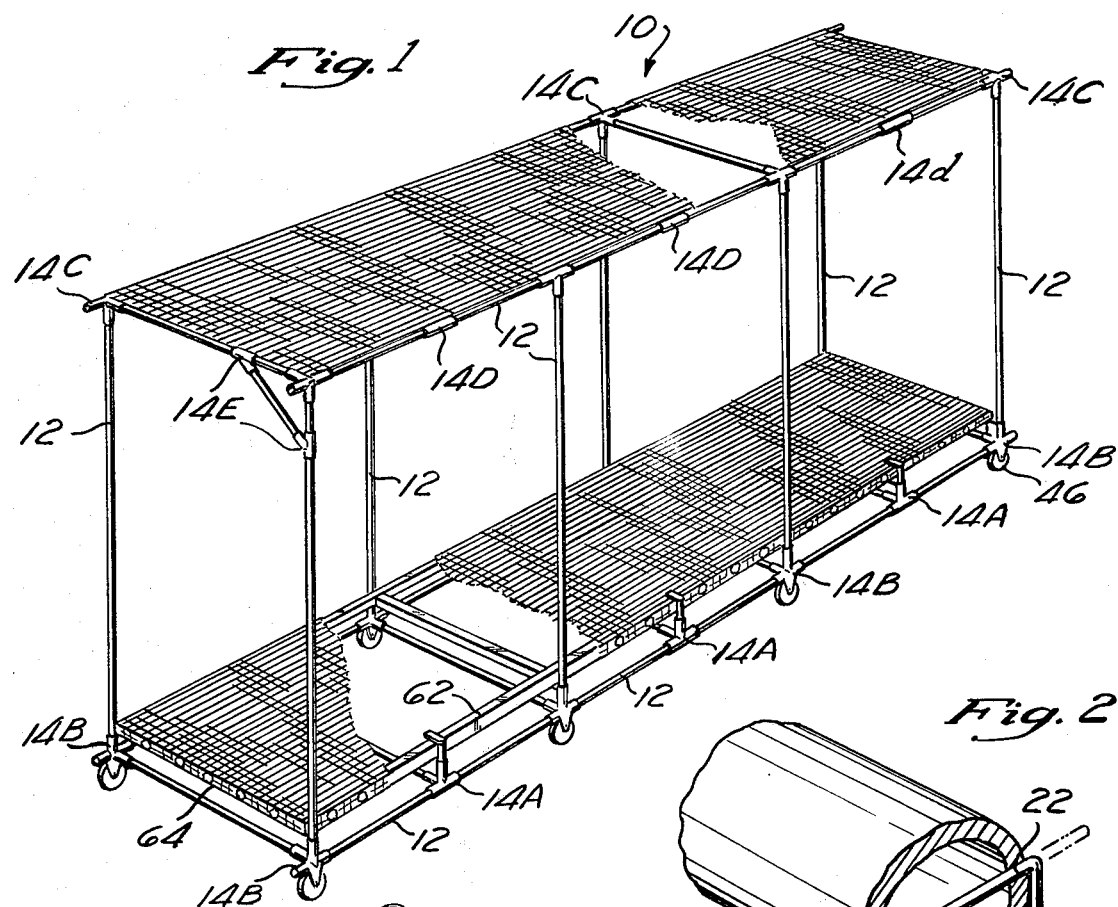
FIG. 1 is a perspective view of the improved heat treatment fixture of the present invention.
Figure 2:
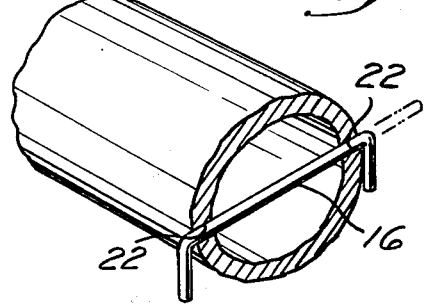
FIG. 2 is an enlarged persective view of the particular pin connectors of the present invention which are utilized to interconnect the cylindrical tubing segments to the cast couplings.

Referring to FIG. 1, there is shown the improved heat treatment fixture 10 of the present invention. The fixture 10 is formed from a plurality of equi-diameter cylindrical tubing segments 12 which are slidingly received within an appropriate mating coupling 14A, 14B, 14C, 14D, 14E and maintained therein by way of plural connector pins 16. In the preferred embodiment, the cylindrical tubing segments 12 and couplings 14A through 14E are formed of a nickel/carbon steel alloy 3515 which possesses significantly less weight and is capable of being elevated in temperature at a substantially faster rate than conventional stainless steel alloys. However, alternative materials including stainless steel, can be utilized and such other materials are contemplated within the spirit of the present invention.

As best shown in FIGS. 6 through 9, the various couplings 14A through 14E are formed in a configuration generally analgous to conventional polyvinyl chloride (PVC) and/or copper plumbing couplings and are utilized at specific locations upon the fixture 10 to yield a composite frame structure; with the support "T" coupling 14A and wheel "T" coupling 14B being utilized on the lower portion of the fixture 10 while the multiple "T" coupling 14C, single "T" coupling 14D, and diagonal joint coupling 14E are utilized on the upper portion of the fixture 10.

As will be recognized, each of the couplings 14A through 14E are formed to slidingly receive the ends of an appropriate cylindrical tubing segment 12 and are provided with a pair of small apertures 20 which extend through their wall thickness adjacent their distal ends. Opposite ends of each of the cylindrical tubing segments 12 are additionally provided with a pair of small apertures 22 extending throughout their wall thickness which are located to permit the mutual alignment of the apertures 22 of the tubing segments 12 with the apertures 20 formed on the couplings 14A through 14E when the tubing segments 12 are inserted within the couplings 14A through 14E. The diameter of the small apertures 20 and 22 are preferably sized to be slightly greater than the diameter of the connecting pins 16 such that the pins 16 may be easily inserted through the aligned apertures 20 and 22 as depicted in FIG. 6.

In the preferred embodiment, the connector pins 16 are formed from a malleable or ductile material such as 8-gauge wire and may be readily inserted through the apertures 20 and 22 and subsequently manually deformed or bent over the outward side of the appropriate couplings 14A through 14E to maintain the plural tubing segments 12 in engagement with the couplings 14A through 14E. As will be recognized, due to the sliding fit of the plural tubing segments 12 within couplings 14A through 14E, and the interconnection of the same by way of the malleable wire pins 16, a moderate amount of movement between the tubing sections 12 and couplings 14A through 14E is accommodated which has been found to yield a frame structure having sufficient rigidity to support the multiple parts (not shown) desired to be heat treated yet readily accommodate without damage, the thermal expansions and contractions encountered in the heat treating process.

Figure 3:
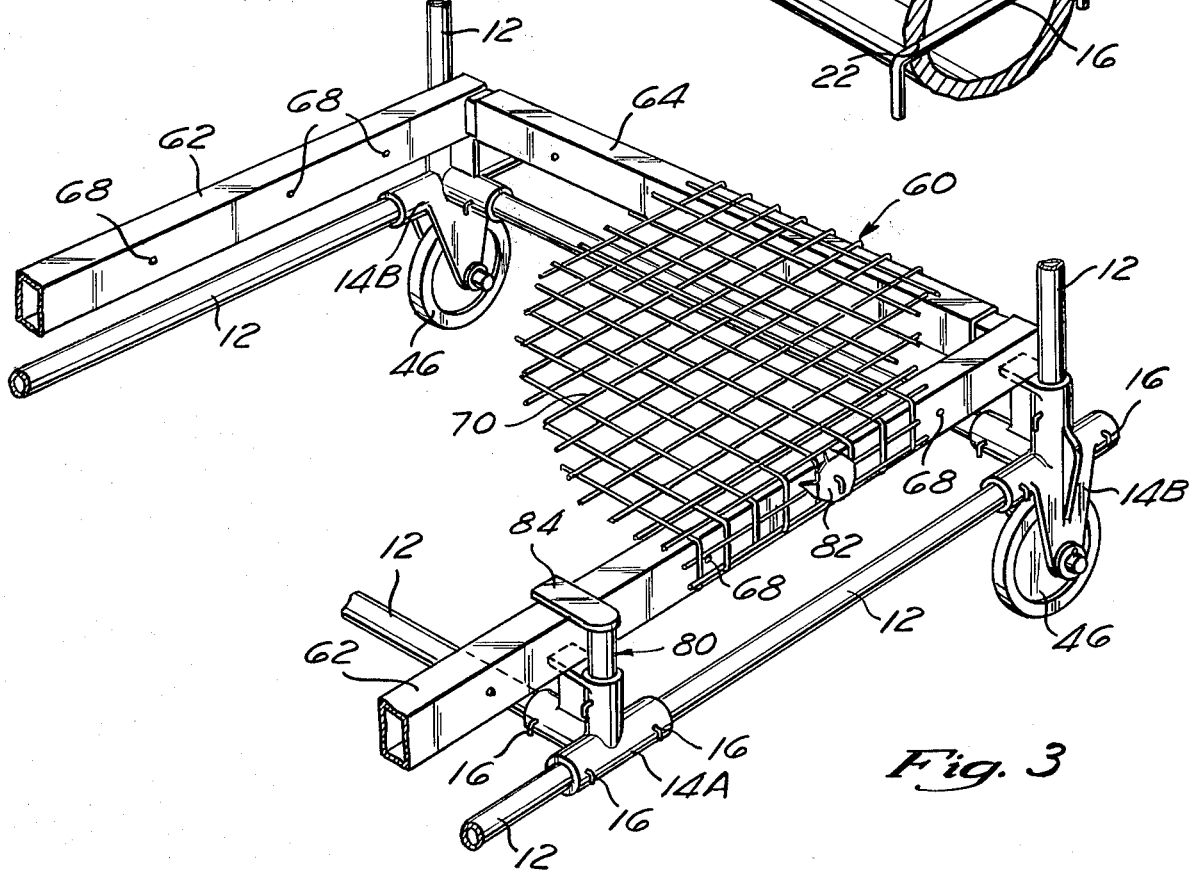
FIG. 3 is an enlarged partial perspective view of the lower tubing frame assembly of the present invention depicting the structure and method of mounting the wire mesh part tray thereon.

Referring more particularly to FIGS. 3, 6, and 7, it may be seen that the lowermost portion of the fixture 10 is composed of a plurality of tubing segments 12 which are interconnected to plural support "T" couplings 14A and wheel couplings 14B. Both the support "T" couplings 14A and wheel "T" couplings 14B include four tubing segment receiving apertures 26A and 26B, respectively, which are located on the standard XYZ axis coordinates. In addition, both of these couplings 14A and 14B are provided with a support flange 32A and 32B, respectively, which extends vertically upward along the "Y" coordinate axis of the couplings 14A and 14B terminating in a relatively broad flat surface disposed in the plane of the "X" coordinate axis.

In conradistinction to the support "T" couplings 14A, the wheel "T" couplings 14B include a pair of legs 40 which extend downward in a generally vertical direction along the "Y" coordinate axis of the coupling 14B and are spaced from one another through a short distance. An aperture 42 is provided adjacent the distal end of each of the leg members 40 which is sized to receive an axle 44 therethrough. The axle 44 mounts a wheel 46 preferably cast and formed of the same material as the wheel coupling 14B. As shown in FIG. 6, the wheel 46 is preferably provided with a taper bearing 48 and the axle 44, wheel 46, and bearing 48, the applicants have found that the wheel 46 is not susceptible to becoming locked or frozen on the axle 44 during the heat treatment operation and therefore, insures that the fixture 10 may be readily manually transported into and out of the heat treatment furnace throughout prolonged working durations.

Referring to FIGS. 1 and 3, it will be recognized that the lowermost portion of the fixture 10 is formed by inserting the plural cylindrical tubing segments 12 into the apertures 26A and 26B of the support "T" couplings 14A and wheel "T" couplings 14B and, subsequently, inserting the plural connecting pins 16 through the same in the manner previously described. In the preferred embodiment, the support "T" couplings 14A are disposed between adjacent pairs of the wheel "T" couplings 14B so as to provide an intermediate support for the lowermost frame portion of the fixture 10.

In contrast to the prior art heat treatment fixture designs, the present invention utilizes a unique part tray 60 formed from a wire mesh frame construction. As shown in FIGS. 3 through 5, the part tray 60 includes a pair of side frame members 62 and end frame members 64 formed in a rectangular tubular configuration. The side members 62 are each provided with a tubing extension 66 which extends in a direction substantially normal to the center line of the side frame members 62 and is rigidly connected thereto as by way of a fillet weld. The ouside dimensions of the extensions 66 are sized to be slightly less than the inside tubular opening of the end frame member 64 such that the extension 66 may be telescoped or slidingly received within the interior of the end members 64. A plurality of pin-receiving apertures 68 extend through the wall thickness the side frame members 62, end frame members 64 and extensions 66 which are each sized to receive a connecting pin 16 formed in the manner previously described. Hence, with the extensions 66 inserted within the interior of the end frame members 64, a frame assembly is formed for the part tray 60.

A wire mesh 70 placed over the top surface of the part tray frame extends a short distance downward along the exterior portion of the side and end frame members 62 and 64. To maintain the mesh 70 on the frame members 62 and 64, the present invention utilizes a plurality of wire mesh pins 80 (shown in FIG. 4) which are formed in an analgous manner to the connecting pins 16 but further include a wire mesh washer 82 adjacent one end thereof. The washer 82 is provided with plural penetrator portions 84 which extend in a direction generally normal to the main portion of the washer 82. As best shown in FIG. 5, with the wire mesh 70 stretched across the part tray frame, the end portions of the wire mesh 70 may be overlapped upon each other and the plural wire mesh pins 80 may be inserted through the plural apertures 68 formed in the end and side frame member 62 and 64. Inserted in such a manner, the penetrator points 84 of each of the washers 82 engage the wire mesh 70 and securely maintains the same relative to the pin 80, which of course may be locked into position upon the side and end frame members 62 and 64 by bending or deforming the distal ends of the same downward as depicted in FIG. 5.

As will be recognized, by such construction, the wire mesh 70 serves to adequately support multiple parts desired to be heat treated (not shown) while providing a minimum amount of material adjacent the parts; thus reducing the overall capacity requirements of the heat treatment furnace (not shown) to heat the parts to the particular heat treatment temperature. Further, when after prolonged use, it becomes necessary to repair the part tray 60, the user may merely remove the plural wire mesh pins 80 from the side and end frame members 62 and 64 and replace the wire mesh 70 in a simple and easy fahsion directly within the field.

As shown in FIG. 3, the part tray 60 is positioned adjacent the lowermost portion of the fixture 10 and rests upon the plural support flanges 32A and 32B of the support "T" couplings 14A and wheel "T" couplings 14B, respectively. To maintain the same in this desired location, a part tray hold down member 80 is utilized (see FIG. 7). The hold down member 80 is formed having an elongate cylindrical portion 82, the outside diameter of which is sized to be slidingly received within the aperture 26B formed in the support "T" coupling 14A, and a flat leg portion 84 which extends in a direction generally normal to the axis of the elongate portion 82.

With the part tray 60 resting upon the support flanges 32A of the support "T" couplings 14A, and wheel "T" couplings 14B, the elongate cylindrical portion 82 of the hold down member 80 may be inserted into the aperture 26B formed in each of the support "T" couplings 14A, whereby, the flat portion 84 of the hold down member 80 contacts the upper surface of the part tray 60. Disposed in this position, a pin connector 16 may be inserted through the apertures 20 formed in the support "T" coupling 14A and inserted through an aligned aperture 86 formed in the elongate portion 82 of the hold down member 80 to maintain the assembly.

Referring to FIG. 1, 8, and 9, it may be seen that the uppermost portion of the fixture 10 is composed in a similar fashion to the lowermost portion, with a plurality of tubing segments 12 (indicated in phantom lines) being interconnected to plural multiple "T" coupling 14C, single "T" couplings 14D, and diagonal couplings 14E. As will be recognized, the multiple "T" couplings 14C are formed in an analgous manner to the support "T" couplings 14A except that they do not include the support flanges 34A thereon, while the single "T" couplings 14D are formed in an analgous manner to the multiple "T" coupling 14C except that they include one less tubing segment receiving aperture 26D thereon. As with the lower portion of the fixture 10, the uppermost portion of the fixture 10 is formed as a frame network with the single "T" couplings 14B being interdisposed between adajcent multiple "T" couplings 14C and all of the cylindrical tubing segments 12 being interconnected to the couplings 14B and 14D by way of the connecting pins 16 being inserted through the apertures 20 and 22 formed in the couplings 14C and 14D and tubing segments 12 respectively. Hence, the uppermost portion of the fixture 10 similarly permits minor relative movement between the couplings 14C and 14D and tubing segments 12 during the heat treatment process.

In the preferred embodiment, the uppermost portion of the fixture 10 is additionally provided with a wire mesh covering 71, which may be stretched in a planar orientation across the tubing segments 12 and be maintained thereon as by way of the wire mesh pin connectors 80 (FIG. 4) extending through the apertures 22 formed in the plural tubing segments 12. However, those skilled in the art will recognize that the use of the upper wire mesh 71 is optional and may be removed from the fixture 10 without departing from the spirit of the present invention.

As best shown in FIG. 1, the upper and lowermost portions of the fixture 10 are interconnected by way of plural tubular segments 12 which extend vertically between the "Y" coordinate tubing segment apertures 26B and 26C formed in the wheel "T" coupling 14B and multiple "T" coupling 14C. The length of the particular tubular segments 12 for this purpose may be modified to yield an overall height and, hence, capacity for the fixture 10 to meet the particular heat treatment application. To provide a moderate amount of increased rigidity between the uppermost and lowermost portions of the fixture 10, the diagonal couplings 14E may be provided adjacent the ends of the fixture 10 (as indicated in FIGS. 1 and 8) which limit substantial movement between the lowermost and uppermost portions of the fixture structure 10 in the "Z" coordinate plane.

In view of the use of the multiple couplings 14A through 14E and equi-diameter-sized cyclindrical tubing segment 12, it will be recognized that the present invention incorporates a modular type construction which permits the overall size and capacity of the fixture 10 to be rapidly modified directly within the field merely by varying the length of the particular cylindrical tubing segments 12. In addition, since the multiple "T" couplings 14C and wheel "T" couplings are disposed on the distal ends of the overall fixture 10, it will be recognized that multiple fixtures may be rapidly interconnected in an end to end orientation merely by inserting a short length of cylindrical tubing segment into the respective apertures 26B and 26C along with the suitable pin connectors 22.

Thus, in summary, the present invention provides a significant improvement in the art by providing a heat treatment fixture which permits moderate movement between the tubing members and couplings to accommodate thermal expansion developed during the heat treatment process, permits the rapid of the fixture 10 directly at the user's facility, and is adapted to be rapidly modified in size and capacity to meet various heat treatment requirements.

What is claimed is:

1. An improved heat treatment fixture for use in a heat treatment process, comprising:
   a plurality of elongate members;
   a plurality of couplings, each said coupling being cast as a single piece having a plurality of passages therein, each said passage being formed to receive an end of at least one of said plurality of elongate members to assemble said plurality of elongate members into a frame structure;
   means carried by said frame structure for supporting parts desired to be heat treated thereon; and
   means for interconnecting said plurality of elongate members to said plurality of couplings to permit moderate movement of said plurality of elongate members relative to said plurality of couplings in response to thermal expansion encountered during the heat treatment process.

2. The improved heat treatment fixture of claim 1 wherein said interconnecting means comprises a plurality of deformable pins, each of said deformable pins being insertable through a respective one of said plurality of couplings and said plurality of elongate members.

3. The improved heat treatment fixture of claim 2 wherein said plurality of elongate members comprise a plurality of tubular elongate members.

4. The improved heat treatment fixture of claim 3 wherein said supporting means comprises a wire screen.

5. The improved heat treatment fixture of claim 4 wheren said wire screen is mounted to a tray fixture.

6. The improved heat treatment fixture of claim 5 including a tray hold down member for removably mounting said wire screen and said tray frame to said frame structure said tray hold down member including: an elongate member slidable within a passage in one of said couplings, a leg portion extending over said wire screen, and pin means for connecting the elongate member of said hold down member in the passage in said support coupling to mount said wire screen to said tray frame.

7. The improved heat treatment fixture of claim 2 wherein said plurality of elongate members and said plurality of couplings are formed of a nickel alloy.

8. The improved heat treatment fixture of claim 7 wherein said plurality of couplings are formed of a cast nickel alloy.

9. The improved heat treatment fixture of claim 7 wherein said plurality of elongate members are each formed having a cylindrical tubular cross-section.

10. A fixture for supporting articles in a heat treatment process, comprising:
    a plurality of elongate members;
    a plurality of wheel couplings, each said wheel coupling being cast as a single piece and formed to have three mutually perpendicular passages therein, each said passage being configured for receiving one end of one of said elongate members for assembling said plurality of elongate members into a support frame structure, each of said wheel corner couplings, including a pair of integrally cast legs for mounting a wheel and axle thereto;
    a tray frame for mounting on said frame structure;
    a layer of wire mesh mounted to said tray frame;
    a first support coupling connected between a pair of said elongate members on a first side of said support frame, said first support coupling being cast as a single piece and including a plurality of passages therein;
    a first tray hold down member having an elongate portion for insertion into one of the passages within said first support coupling;
    means for removably mounting said elongate portion of said first hold down member in the passage in said first support coupling to secure a first side of said tray frame to said support frame;
    a second support coupling connected between a second pair of said elongate members in a second side of said support frame, said second support coupling being casted as a single piece and including a plurality of passages therein;
    a second tray hold down member having an elongate portion for insertion into one of the passages in said second support coupling; and
    means for removably mounting the elongate portion of said second hold down member in the passage in said second support coupling to secure a second side of said tray frame to said support frame.

11. The fixture of claim 10, wherein said tray frame comprises:
    a plurality of interconnected tubular members having a plurality of apertures therein, said wire mesh screen overlapping said apertures;
    a plurality of washers having apertures alined with the apertures of said tray frame, said washers including projections for engaging said wire mesh screen to retain said wire mesh screen against movement relative to said tray frame; and
    a plurality of pins for mounting through the apertures in said washers and the apertures in said tray frame to retain said washers and said wire mesh screen in a predetermined position upon said tray frame.

* * * * *